United States Patent [19]

Church

[11] 3,753,567

[45] Aug. 21, 1973

[54] RECORD MECHANISM FOR A TAPE PLAYER

[75] Inventor: Victor E. Church, Park Ridge, Ill.

[73] Assignee: Motorola, Inc., Franklin Park, Ill.

[22] Filed: Feb. 1, 1971

[21] Appl. No.: 111,386

[52] U.S. Cl. ................ 274/4 B, 200/5 E, 200/17 R, 200/169 PB, 179/100.2 Z

[51] Int. Cl. ............................................ G11b 23/00

[58] Field of Search ............ 200/5 E, 17 R, 169 PB; 274/4 B, 4 C, 4 E, 4 G, 11 B, 11 C; 179/100.2 Z

[56] References Cited

UNITED STATES PATENTS

| | | | |
|---|---|---|---|
| 3,488,058 | 1/1970 | Staar | 274/4 E |
| 3,702,907 | 11/1972 | Sato | 274/4 C |
| 3,248,066 | 4/1966 | Andrews | 274/4 C |

*Primary Examiner*—Louis R. Prince
*Assistant Examiner*—Dennis A. Dearing
*Attorney*—Vincent Rauner and J. LaPorte

[57] ABSTRACT

A locking mechanism for the pushbutton selector used in choosing the mode of operation of a cartridge type tape player-recorder includes a pivotal lever arm, one end of which extends into a cartridge receiving cavity for engagement with a cartridge inserted thereinto and the other end of which is positioned for engagement with the pushbutton selector. A cartridge inserted into the cavity engages the first mentioned end of the lever arm causing the opposite end to engage the pushbutton thereby to maintain the pushbutton in a preselected position. The pushbutton is freed upon withdrawal of the cartridge from the cavity.

6 Claims, 5 Drawing Figures

Patented Aug. 21, 1973 3,753,567

INVENTOR
VICTOR CHURCH
BY
Ronald J. La Porte
ATTORNEY

RECORD MECHANISM FOR A TAPE PLAYER

BACKGROUND OF THE INVENTION

This invention relates generally to cartridge type tape player-recorders and more particularly to control mechanisms for selecting the mode of operation of the player-recorder.

In a cartridge type tape player-recorder it is important during the playing of a pre-recorded tape cartridge that the mechanism controlling the mode of operation of the device cannot be inadvertently or accidentally actuated to change the mode of operation. If the latter should occur, the information recorded on the tape cartridge would very likely be destroyed. In the case where the pre-recorded information cannot be duplicated, the information would be lost forever.

On the other hand, if a control of the tape player-recorder device were set to the record mode and should be shifted to a play setting, unnoticed by the operator, the information believed to be recorded would likewise be lost.

SUMMARY OF THE INVENTION

Accordingly, it is a primary object of the present invention to provide in a cartridge type tape player-recorder device, a new and improved mechanism to prevent the inadvertent or accidental changing of the mode of operation of the device once the mode of operation has been selected and when a cartridge has been inserted into the device.

It is another object of the present invention to provide a mechanism of the above described type which locks the mode selector into a pre-selected position in response to the insertion of a tape cartridge into the device.

It is yet another object of the instant invention to provide a mode selector locking mechanism for a cartridge type tape player-recorder which is reliable, efficient in operation and relatively simple in construction.

Briefly, a preferred embodiment of a locking mechanism for the control for selecting the mode of operation of a tape cartridge player-recorder device comprises a lever arm mounted for pivotal movement between a first and second position and being normally spring biased toward the first position. A first end of the lever arm extends into the cartridge receiving cavity of the player-recorder device for engagement with a cartridge inserted thereinto. The opposite end of the lever arm is positioned for engagement with a mode selector control button, the latter being normally released to place the circuitry and mode selection instrumentalities into a "play" condition and depressable to place the last mentioned selector in the "record" condition.

The mode selector button is engaged by the above described end of the lever arm upon insertion of the cartridge into the cavity of the player-recorder to maintain the button in a released or depressed position depending upon the positioning thereof at the time of the insertion of the cartridge.

DETAILED DESCRIPTION

Figures 1, 2, 3:
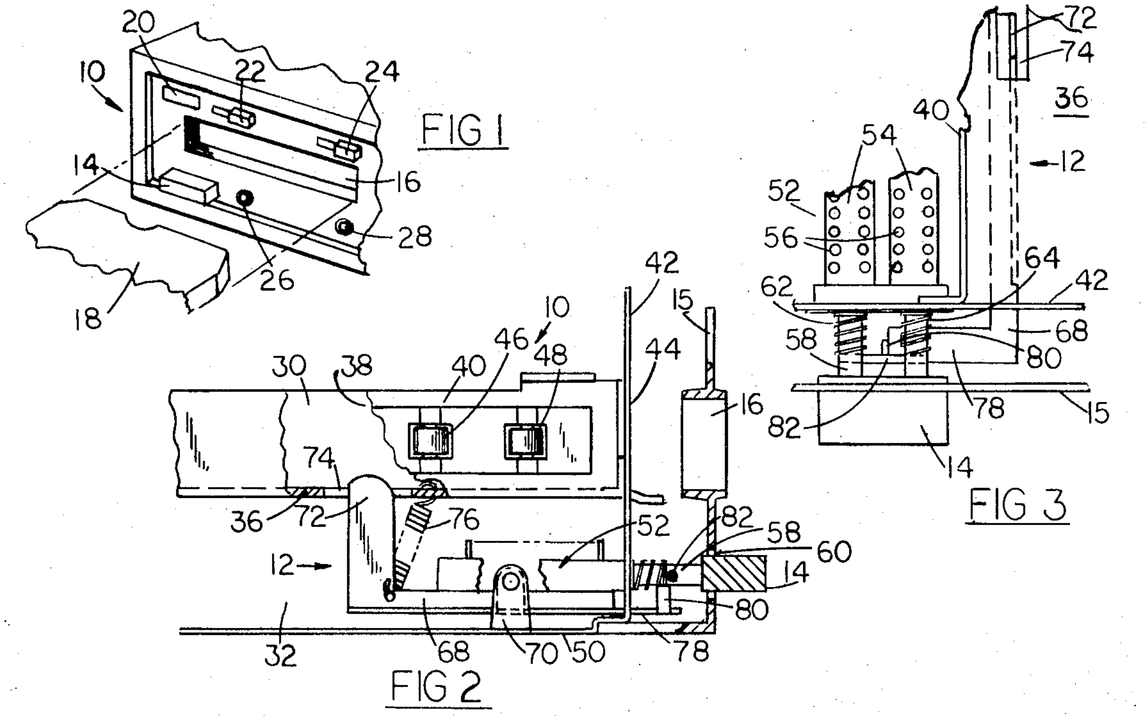
FIG. 1 is a partially sectioned, perspective view of a cartridge type tape player-recorder employing a mechanism for locking the selector used to choose the mode of operation of the player-recorder, into a pre-selected position, according to the invention.
FIG. 2 is a side sectional view of the tape player-recorder of FIG. 1 illustrating a preferred embodiment of a locking mechanism for the mode selector according to the invention.
FIG. 3 is an enlarged, top, partially sectioned view of the mode selector switch of the tape player-recorder of FIG. 1.

Referring now to the drawings in greater detail wherein like numerals are employed to identify similar components throughout the various views, FIG. 1 illustrates a stereophonic cartridge type tape player-recorder device 10 including a mechanism 12 according to the invention (see FIGS. 2–5) for releasably locking the mode selector control button 14 in a pre-selected position, i.e., play or record position, in accordance with the receipt therein of a pre-recorded or unrecorded tape cartridge 18, respectively. The tape player-recorder device 10 includes, mounted in the front wall 15 thereof adjacent cartridge receiving aperture 16, the usual controls and meters, such as, for example, a volume level indicator 20, separate channel volume controls 22, 24 and microphone jack receptacles 26, 28.

Figure 4:
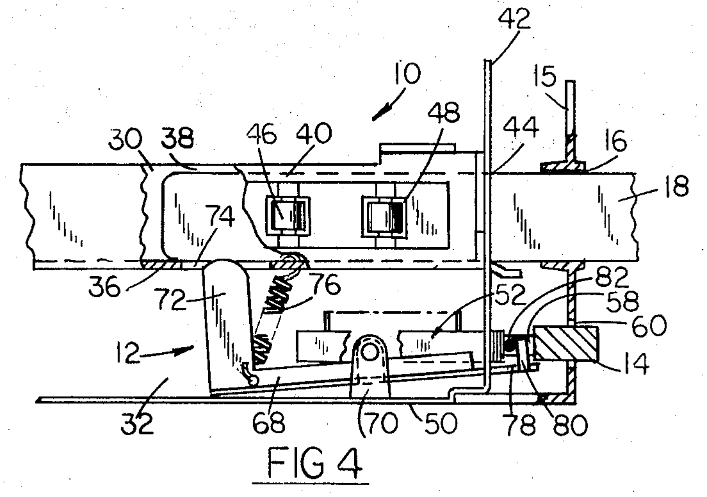
FIGS. 4 and 5 are side sectional views of the tape player-recorder of FIG. 1 illustrating the mode selector locking mechanism in the record and play positions, respectively.
Figure 5:
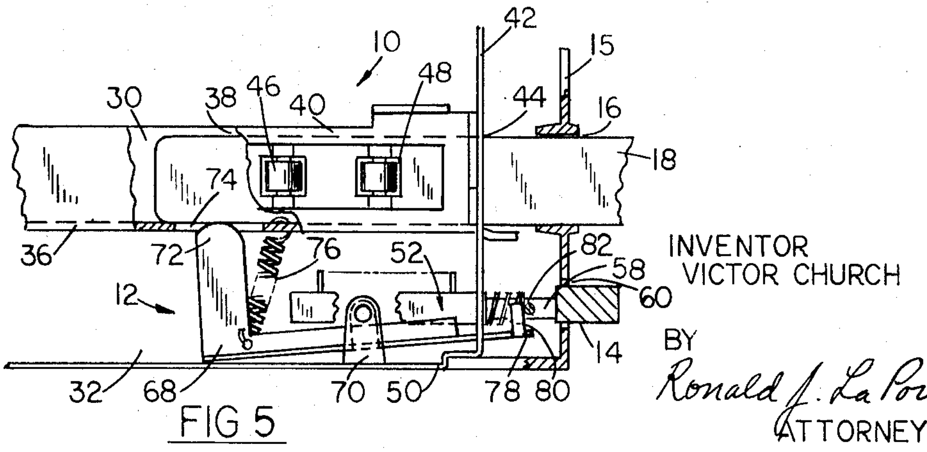

FIGS. 2–5 of the drawing illustrate in greater detail the tape player-recorder device 10 incorporating the mode selector locking mechanism 12 according to the invention. As seen in FIGS. 2, 4 and 5, the device is divided into upper and lower cavities 30, 32. The upper cavity 30 is defined by base wall 36, interconnected by a pair of side walls 38, 40 and a front partition wall 42 spaced from front wall 15 of the device. The last mentioned wall 42 includes an aperture 44 through which a cartridge entering cavity 30 passes. Rollers 46 are mounted in apertures 48 in side wall 40 to guide a cartridge 18 accurately into cavity 30.

The lower compartment or cavity 32 is defined by upper wall 36, a lower wall 50 and front partition wall 42. The lower cavity 32 encloses the mode selector locking mechanism 12 and the mode selector switch designated generally by the numeral 52.

The last mentioned mode selector switch includes a pair of switch banks 54 each having a plurality of electrical pin terminals, such as 56, for making electrical connections to the play and record instrumentalities and circuitry (not shown) of the cartridge type tape player-recorder device 10. The last-mentioned circuitry and play and record instrumentalities are of a conventional design well known to one skilled in the art. Connections in each bank 54 are made and broken in a conventional manner by the movement of an actuator arm or rod 58 thereinto. The actuator rods 58 are both connected to pushbutton 14 which passes through aperture 60 in front wall 15 of the player-recorder device and is biased by coil springs 62, 64, to a first released position whereat the switch 52 operates the tape playing and record circuitry and instrumentalities to the "play" mode of operation. Depression of pushbutton 14 (towards front wall 15 and switch banks 54) operates the last mentioned circuitry and instrumentalities to a "record" mode of operation.

The selector switch locking mechanism 12 according to the invention includes a lever arm 68 mounted near its center for pivotal movement on mounting post 70 extending upwardly from wall 50. A first end 72 of arm 68 extends upwardly therefrom through aperture 74 of wall 36, into cartridge receiving cavity 30 of the player-recorder device 10. The lever arm 68 is resiliently biased by a coil spring 76 connected to the base wall 36 of cavity 30 and to lever arm 68, toward the last described position.

The opposite end 78 of lever arm 68 extends outwardly therefrom in a direction at substantially right angles to end 72 toward rods 58 of selector switch 52. An extreme end portion 80 of end 78 extends upwardly for movement between rods 58 (see FIG. 3) and for engagement with a pin 82 fixed to and extending between rods 58, transverse the direction of movement thereof.

In operation, if the device is to be used for recording an unrecorded tape cartridge, pusbutton 14 is depressed to operate the mode selector switch to a "record" position. Depression of pushbutton 14 moves pin 82 connecting actuator rods 58, from a first position with respect to end 80 of lever arm 68, shown in FIGS. 1, 3 and 5, to a second position (FIG. 4) with respect thereto. As shown in the figures of the drawing the pin 82 is moved from one side to the opposite side of end 80 of arm 68. Pushbutton 14 is maintained in a depressed position while cartridge 18 is inserted through aperture 16 into cavity 30 of the device 10.

As cartridge 18 is inserted into cavity 30, the cartridge engages end 72 of lever arm 68, causing arm 68 to be pivoted about post 70 against the force of spring 76. The pivoting of arm 68 moves end portion 80 of arm 68 upwardly into engagement with pin 82, on one side thereof, thereby to maintain pushbutton 14 in a depressed position and thereby to prevent the return of pushbutton 14 to its original, released position. While cartridge 18 remains in cavity 30, pushbutton 14 cannot be released, and consequently the mode of operation cannot be accidentally or inadvertently changed by the operation of pushbutton 14.

Removal of cartridge 18 from the cavity 30 permits lever arm 68 to return to its original position, disengaging end portion 80 thereof from pin 82. Pushbutton 14 is returned automatically to a released position by the force of springs 62, 64 and switch 52 is operated to return the tape player-recorder instrumentalities to the "play" mode of operation.

If it is desired to play a pre-recorded cartridge in the player-recorder device 10, pushbutton 14 remains in the undepressed or released position (FIG. 2). Cartridge 18 is inserted into cavity 30 for engagement with end 72 of lever arm 68 to in turn pivot the last mentioned arm about post 70. The pivoting of arm 68 moves end portion 80 thereof into engagement with pin 82 on the side thereof opposite the side engaged when the pushbutton 14 is depressed (see FIG. 5). Pushbutton 14 cannot then be depressed to operate switch 52 to the record position. The last mentioned switch is locked into the "play" position, thereby preventing the destruction of information recorded on the tape cartridge 18 by the inadvertent depression of button 14.

Withdrawal of cartridge 18 from cavity 30 permits lever arm 68 to return to its original, normal position, whereby end portion 80 is removed from engagement with pin 82, freeing pushbutton 14.

Thus, the mode selector locking mechanism 12 according to the invention provides a simple but effective means to prevent the inadvertent changing of the mode of operation of a cartridge type tape player-recorder device such as described heretofore. The provision of the mode selector locking mechanism according to the invention prevents the inadvertent or accidental loss of information from pre-recorded tape cartridges as well as the loss of information thought to be recorded on an unrecorded cartridge.

While a particular imbodiment of the invention has been shown and described, it should be understood that the invention is not limited thereto since many modifications may be made. It is therefore contemplated to cover by the present application any and all such modifications as fall within the true spirit and scope of the appended claims.

I claim:

1. In a cartridge type tape player-recorder, including a tape cartridge receiving cavity and instrumentalities for playing pre-recorded tape cartridges and for recording unrecorded tape cartridges received in said cavity, depending upon the mode of operation of the player-recorder and a selector for selecting the mode of operation of said player-recorder, said selector including a switch movable between a record position and a play position, means for releasably and alternatively locking said selector into a preselected position corresponding to one of said two modes of operation, comprising an arm mounted for pivotal movement between a normal and operated position, said arm including at a first end thereof means for directly engaging a cartridge inserted into said cavity, said means extending into said cavity when said arm is in said normal position for engagement with a cartridge inserted thereinto and being urged out of said cavity in response to the engagement with a cartridge inserted thereinto, thereby to pivot said arm to said operated position, the opposite end of said pivotal arm including means for engaging said selector switch in a first and second relation depending upon the positioning of said selector switch in said preselected position, in response to the pivoting of said arm, to maintain said selector switch in said preselected position until said cartridge is removed from said cavity.

2. A cartridge type tape player-recorder as claimed in claim 1 wherein said selector switch means includes a pushbutton actuator movable from a first position whereat said switch means is placed in a play condition to a second, depressed position whereat said switch means is placed in a record condition, said pushbutton actuator being resiliently biased toward said first, play position and including a pin rigidly connected to and movable with said pushbutton, and wherein the engaging means at said opposite end of said arm of said locking means is moved into engagement with said pin on one side thereof when said pushbutton is moved to said second, record position and on the opposite side thereof when said pushbutton is in said first, play position.

3. A cartridge type tape player-recorder including a cartridge receiving cavity and instrumentalities for playing pre-recorded tape cartridges and for recording unrecorded tape cartridges received in said cavity, depending upon the mode of operation of said player-recorder, a selector including switch means connected electrically to said instrumentalities and actuable between first and second positions to place said instrumentalities in the play and record modes of operation, respectively, and means for releasably and alternatively locking said selector into a preselected position corresponding to one of said two modes of operation upon insertion of a cartridge into said cavity, said locking means comprising a lever arm mounted for pivotal movement between first and second positions about a fixed pivot point, means biasing said arm into said first position, said arm including at a first end, means extending into said tape cartridge cavity when said arm is in said first position for direct engagement with said cartridge, the opposite end of said arm including means for engaging said selector upon said arm member being pivoted about said pivot point in response to the insertion of a cartridge into said cavity thereby to maintain said switch means in said preselected position until said cartridge is removed from engagement with said engaging means at said first end of said pivotal arm.

4. A cartridge type tape player as claimed in claim 3 wherein said switch means includes a manually operated pushbutton movable between a first, play position and a second, record position, resilient biasing means biasing said pushbutton to said first position and an elongated member connected to and extending from said pushbutton in a direction transverse the direction of movement of the pushbutton, the second engaging means at the second end of said arm engaging said elongated member on a first side thereof when said pushbutton is moved to said first, play position and on the other side thereof when said pushbutton is moved to said second, record position.

5. A cartridge type tape player-recorder including a cartridge receiving cavity and instrumentalities for playing pre-recorded tape cartridges and for recording unrecorded tape cartridges received in said cavity, depending upon the mode of operation of said instrumentalities, a selector for placing said instrumentalities in a play or record mode of operation, said selector including pushbutton switch means movable between a first, released play position and a second, depressed record position, spring means for biasing said pushbutton switch means to said released position, and means for releasably and alternatively locking said pushbutton selector switch means into a preselected one of said positions upon insertion of a cartridge into said cavity, said locking means comprising: a lever arm member mounted for pivotal movement between first and second positions, resilient biasing means for biasing said lever arm member to said first position, a first end of said lever arm extending into said cartridge receiving cavity when said lever arm is in said first position and including cam means for directly engaging a cartridge inserted into said cavity, whereby said lever arm is pivoted from said first to said second position, and the opposite end of said arm member including means for engaging said switch means when said lever arm member is pivoted to said second position, thereby to maintain said switch means in said pre-selected position until said cartridge is removed from said cavity.

6. A cartridge type tape player-recorder as claimed in claim 5 wherein said locking means is mounted beneath said cartridge receiving cavity and wherein said first end of said lever arm extends into said cavity through a lower wall thereof for engagement with a cartridge received therein, said first end of said lever arm being moved downwardly out of said cavity upon insertion of a cartridge thereinto in engagement with said cam means, and said opposite end of said lever arm being raised into engagement with said pushbutton selector switch means to maintain the latter in a preselected position until said cartridge is removed from said cavity.

* * * * *